Aug. 1, 1939.   E. A. FALLER   2,167,829
CONTROL SYSTEM AND APPARATUS
Filed June 1, 1931   5 Sheets-Sheet 1
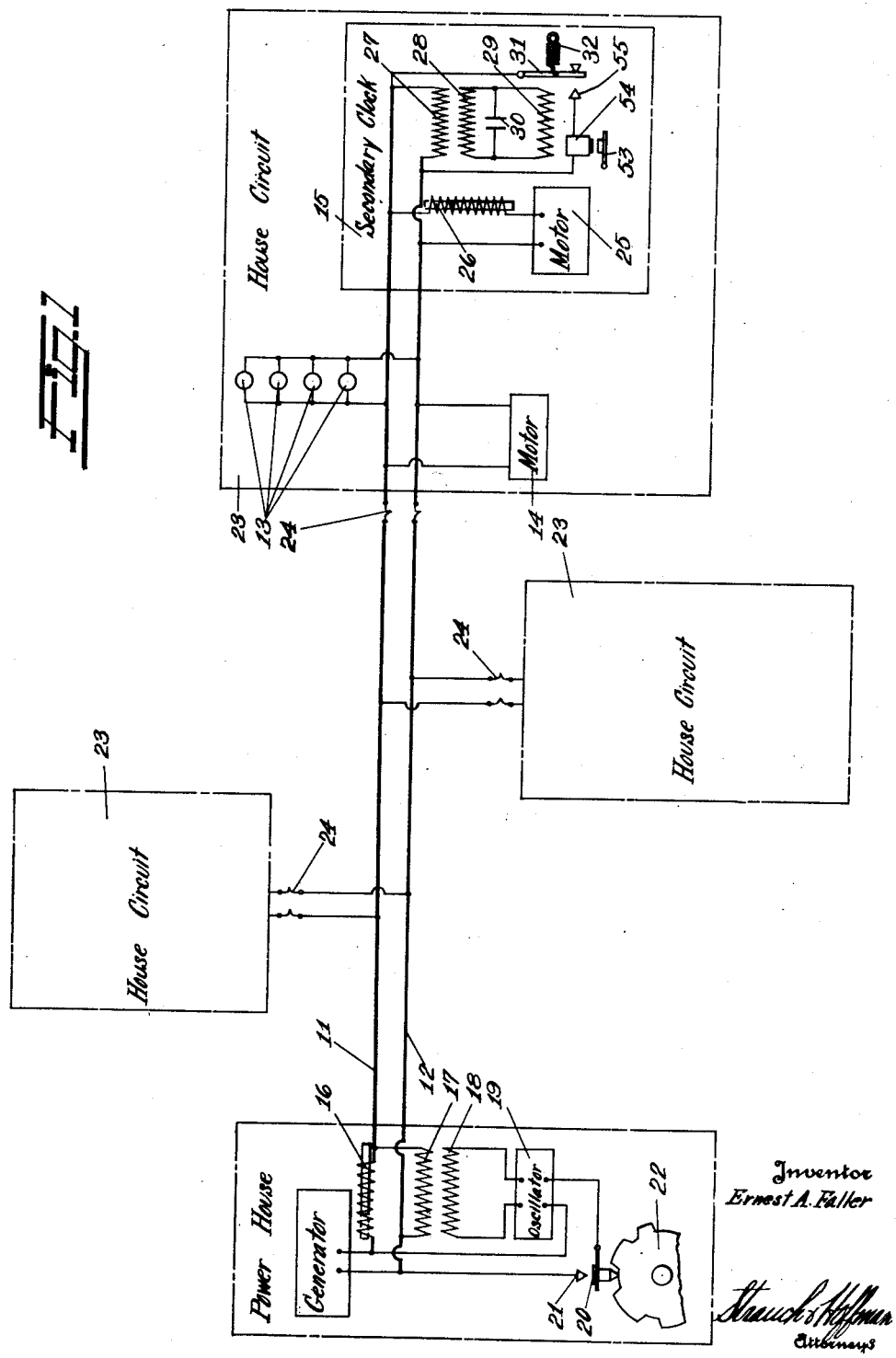

Aug. 1, 1939.  E. A. FALLER  2,167,829
CONTROL SYSTEM AND APPARATUS
Filed June 1, 1931  5 Sheets-Sheet 2
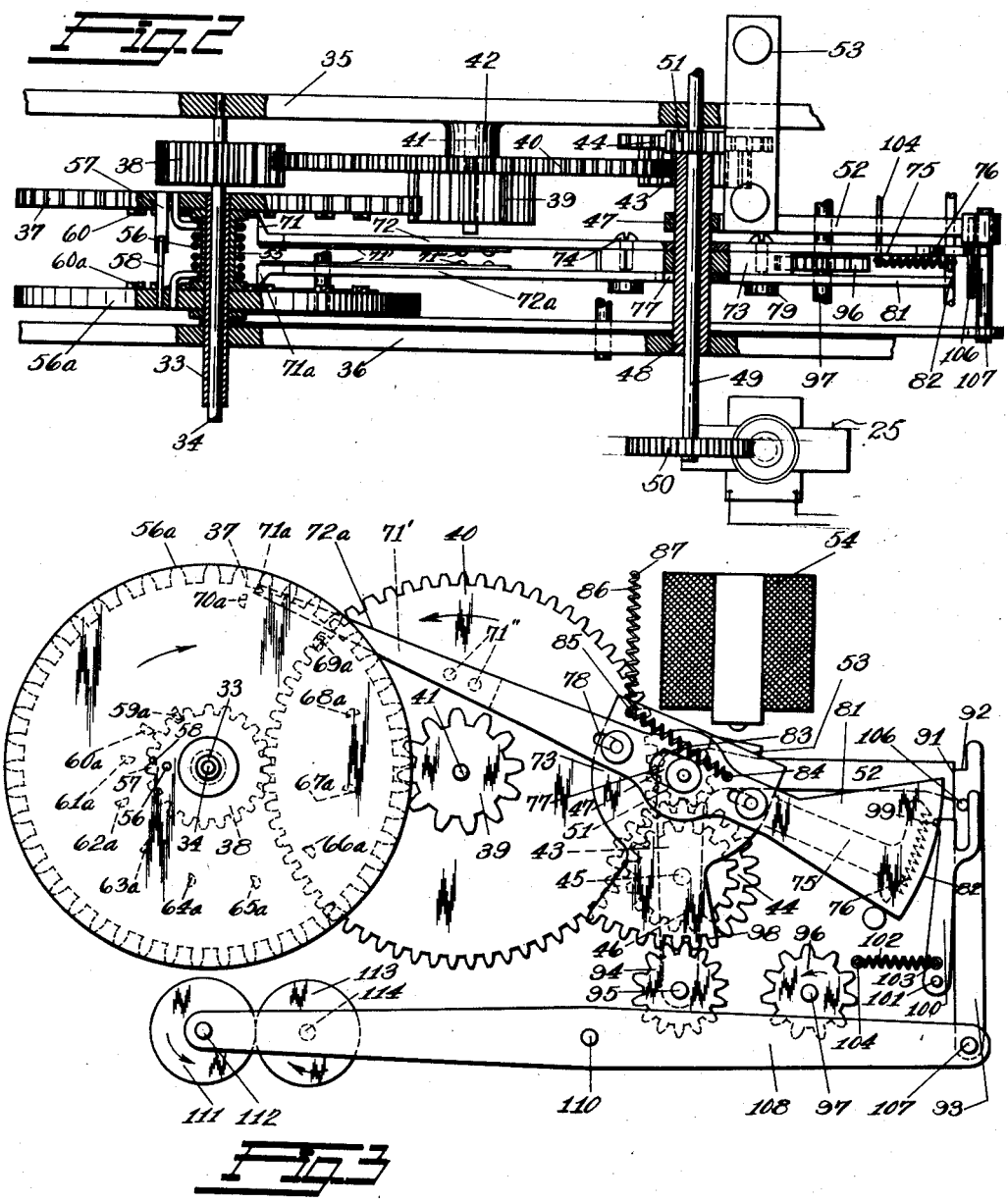
Inventor
Ernest A. Faller
By
Strauch & Hoffman
Attorneys Aug. 1, 1939.  E. A. FALLER  2,167,829
CONTROL SYSTEM AND APPARATUS
Filed June 1, 1931   5 Sheets-Sheet 3
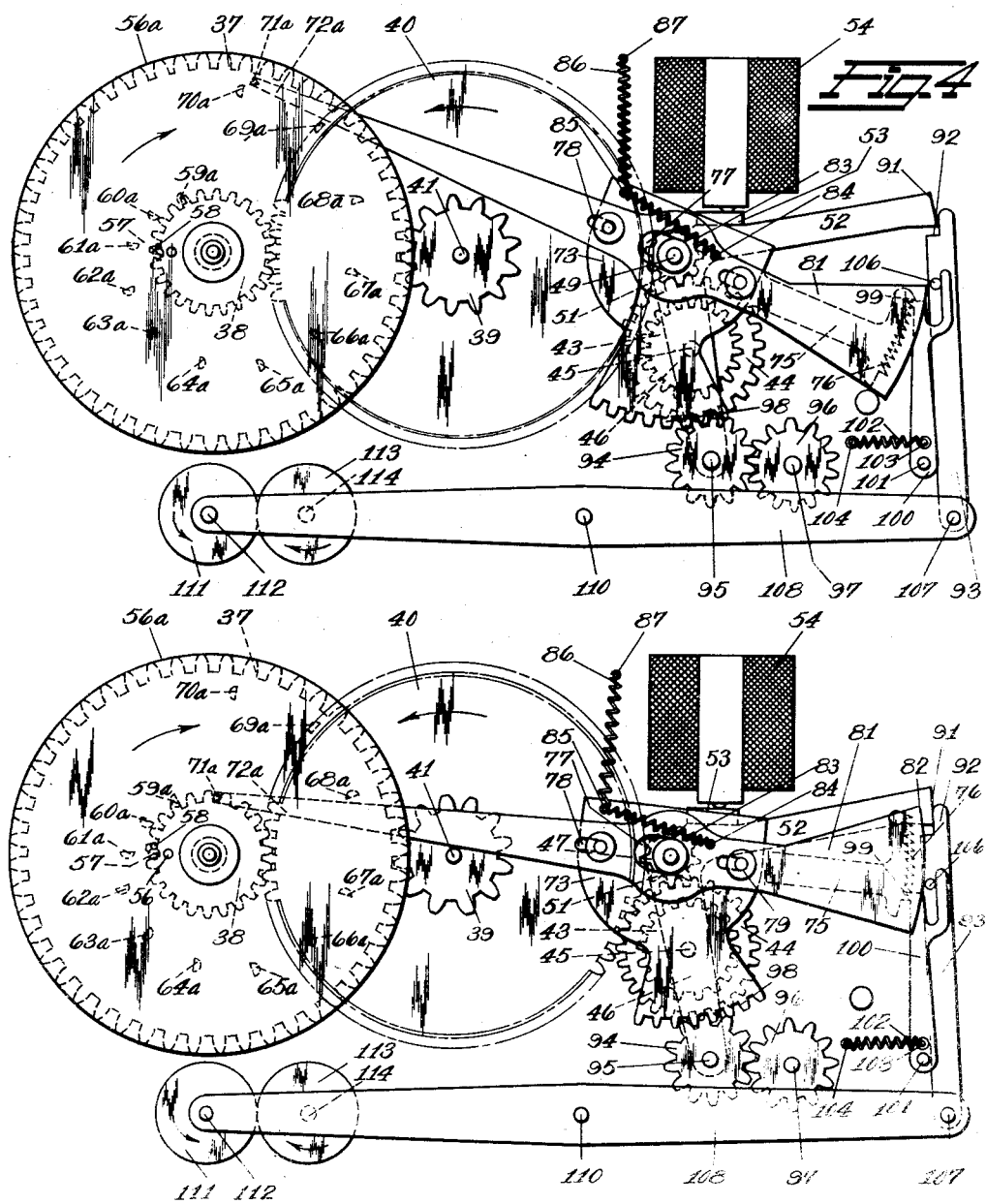
Inventor
Ernest A. Faller
By Strauch & Hoffman
Attorneys

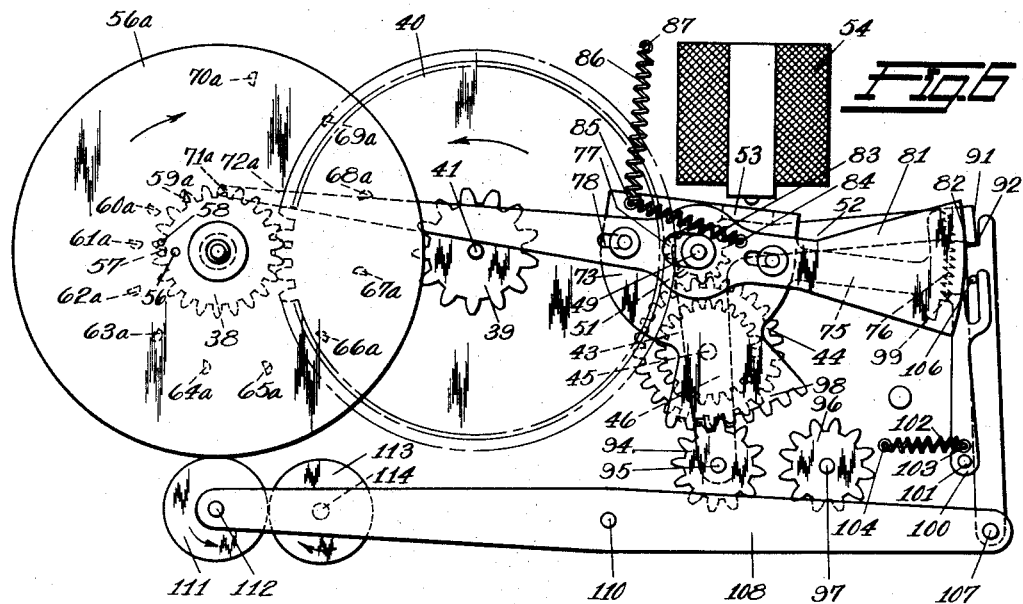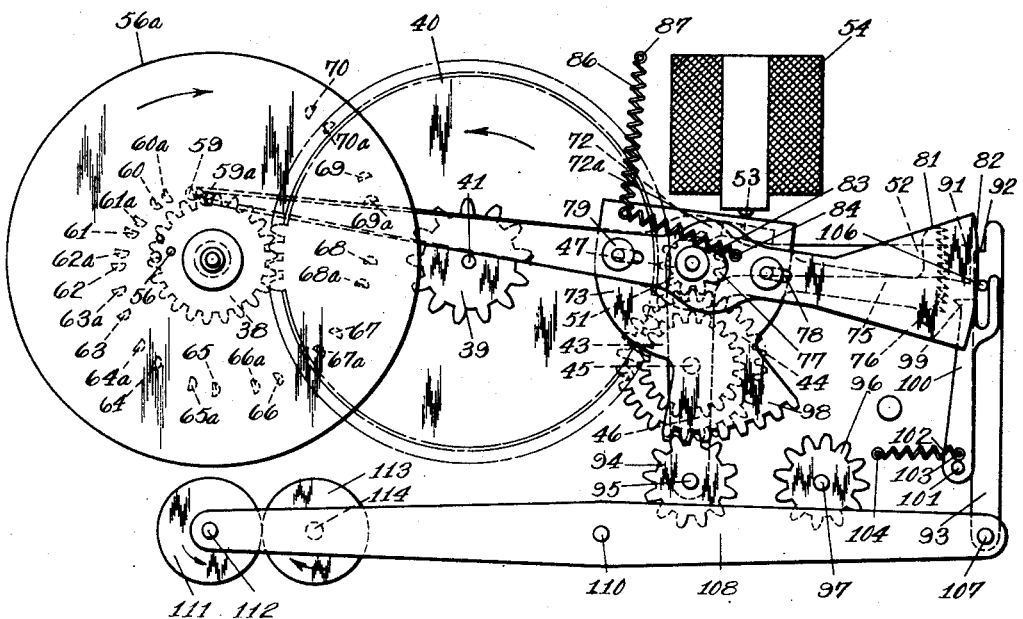

Aug. 1, 1939.  E. A. FALLER  2,167,829
CONTROL SYSTEM AND APPARATUS
Filed June 1, 1931  5 Sheets-Sheet 5
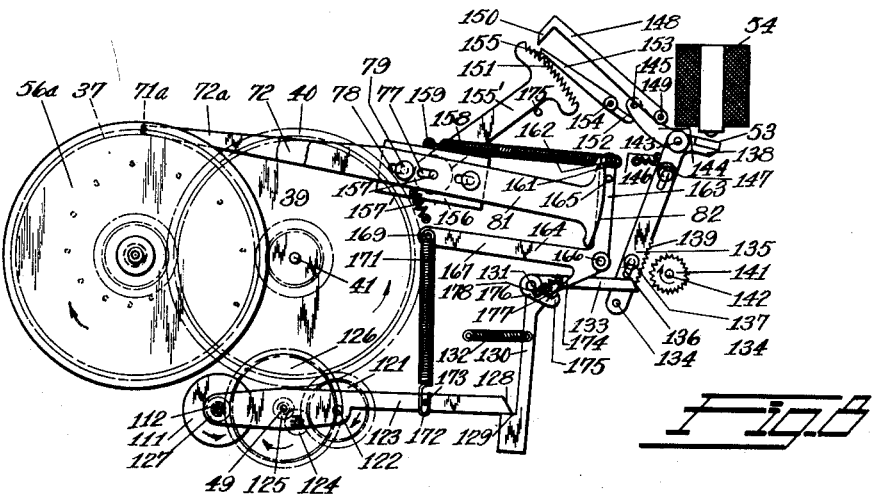
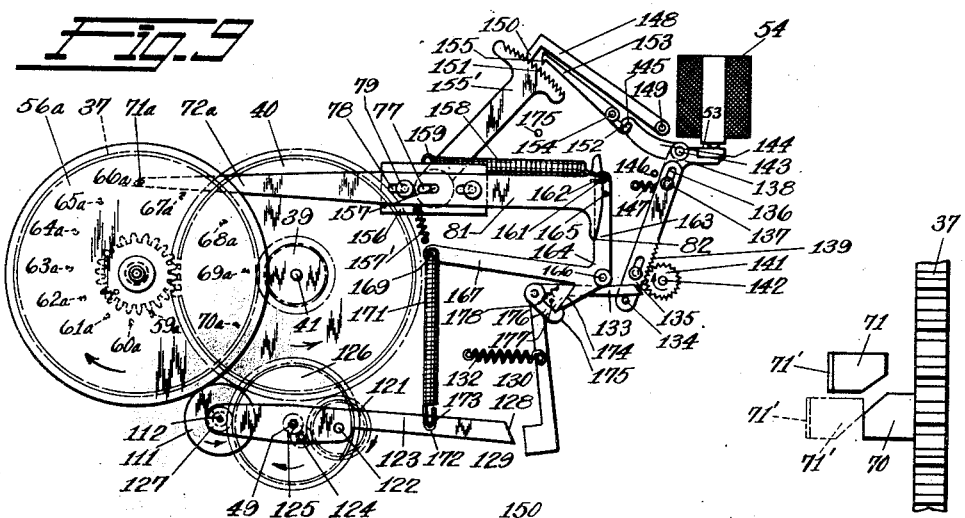
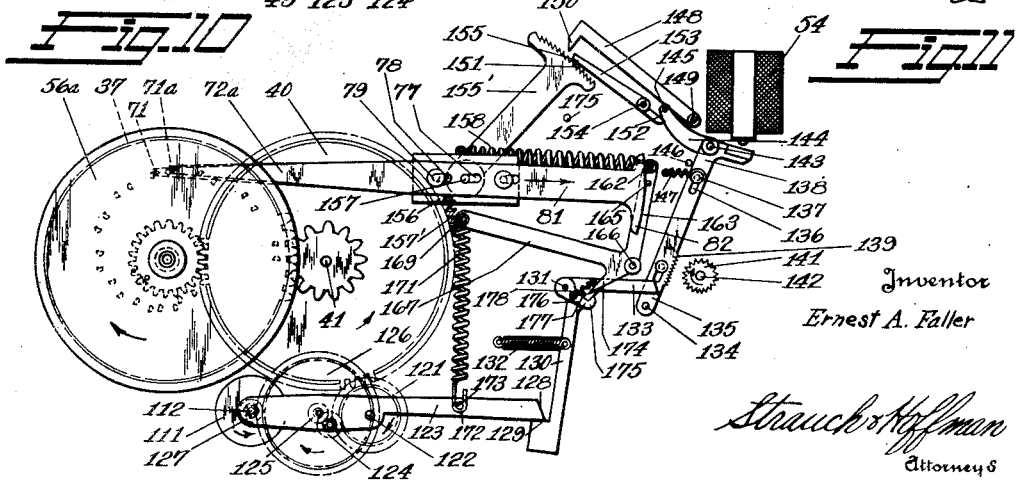
Inventor
Ernest A. Faller
Strauch & Hoffman
Attorneys Patented Aug. 1, 1939

2,167,829

UNITED STATES PATENT OFFICE 2,167,829

CONTROL SYSTEM AND APPARATUS

Ernest A. Faller, Brooklyn, N. Y.

Application June 1, 1931, Serial No. 541,402

9 Claims. (Cl. 58—35)

My present invention relates to new and useful control systems and apparatus therefor.

More particularly, my invention relates to novel systems and apparatus especially adapted for operating and controlling electric motor driven mechanisms such, for example, as secondary clocks of the motor type, electrically operated switching mechanisms such as traffic signal mechanisms operated in definite time relation, and the like; and has for its more particular object the periodically recurring correction of such mechanisms from a central station to maintain predetermined unison or phase relationships in the secondry or controlled mechanisms.

Motor electric clocks are old in the art. Briefly speaking, such clocks have no clockwork of the usual type, but the hands thereof are driven by a synchronous alternating current motor of the self-starting type. Provision is made in the power station supplying the driving motors with power to keep the frequency of the system as close to 60 cycles per second as possible, so that the clocks, when once set to proper time, will indicate reasonably correct time as long as there is no interruption to the supply of current to the driving motor.

It has long been recognized that the value of all such clocks depends absolutely on the reliability of the current supply. In all but the largest distribution systems which are operated by all underground cables, interruptions to the supp'y of current are unavoidable. In recognition of this inherent defect, provisions have been made to indicate at the secondary clock, that the current has failed temporarily, as for example, by utilizing a drop annunciator for the purpose of indicating "outage". The technical term "outage" has been coined to indicate failure of current supply in a power network containing motor clocks.

An effort to solve this difficulty has been made by the use of an auxiliary clockwork designed to remain fully wound and arrested in motion by the magnetic effect of the coil of the motor. In the event of failure of the supply current, this clockwork was designed to automatically start and to carry the hands along until such time as the current supply was re-established, so that the clock would still approximately show correct time in spite of outage. It is of course plain that if the outage exceeded the length of time the auxiliary clock was capable of running, then the hands would stop and on recurrence of the potential on the network, the clock would no longer indicate correct time. This deficiency prompted the auxiliary clockwork to be abandoned in favor of an outage indicator as described above. There are a number of other motor clocks on the market, but most of these have no self-starting motor, and rely upon the fact that the clock is stopped to indicate outage has occurred.

In a further effort to partially solve the problem of outage, there has been devised a system in which two motors are used in the secondary clocks, one connected on each side of a three-wire A. C. power supply circuit. The normally operating motor is a synchronous motor driving the hands. When an outage occurs, the other motor which is geared to operate the hands at a speed about twice as high as that of the time motor, gets into action and sets the clocks ahead, each clock in the system being set ahead the same amount. This system employs a weight-driven self-winding master clock on the premises where the controlled clocks are located, to cut the auxiliary fast motor in and out of service when an outage occurs. This system is impractical in the majority of motor clock installations, because of the cost of the master clock and the impossibility of connecting three wires through an attachment plug of the usual household type, a regular conduit wiring being required. This system, furthermore, cannot take care of a condition where the various secondary clocks on an installation are stopped at different times, for example, through the blowing of an individual fuse. It has been proposed, particularly in the foreign art, to send correcting or timing impulses over a network especially provided for clock operating purposes to correct all clocks on a system. Such systems, however, presuppose that all clocks in the network are equally affected by an interruption, such as would be the case of course with a special network, and thus the correction could be accomplished with comparative ease. A representative system of this kind is that of Dr. H. Aaron, patented in Germany under patents numbered 234,538 and 236,456, in which one and the same network serves to send impulses periodically to advance all the clock hands and to correct them. The Aaron system requires a special network for the operation of clocks only, and his system could not be applied to a commercial network, feeding besides clocks, light and power devices.

Accordingly, it is thought broadly new, and it is a primary object of the present invention, to operate secondary clocks, traffic signal mechanisms, and the like, over a commercial network adapted to supply light and power indiscriminately either alternating or direct, and in the case of alternating current, having a frequency high enough for commercial lighting and to operate the clocks or mechanism, and to provide means responsive to signals over the same network to set the clockwork or mechanisms automatically to the correct time or phase relation at regularly recurring intervals, for example, every hour on the hour, regardless of whether the connected clocks or mechanisms have stopped at different times, as for example, where outages occur at different times in part of the network due to the blowing of local fuses in a house circuit.

It is a further object of the present invention to provide novel correcting mechanisms for secondary motor clocks, motor switching or like mechanisms, adapted for periodic correction and adjustment to a desired phase relationship over the motor supply circuit, regardless of the different extents to which the deviation from the desired phase relationship may have occurred between correcting intervals.

Other objects of the invention will appear from the following detailed description of a preferred embodiment of my invention, and are such as may be attained by a utilization of the various novel principles, combinations and sub-combinations hereinafter set forth, and defined by the scope of the appended claims in the various relations to which they are applicable by persons skilled in the art.

As shown in the drawings:

Figure 1 is a schematic diagram of the essential electrical elements and circuit arrangement of a preferred time distributing system embodying my invention.

Figure 2 shows schematically a plan view of the essential elements of a secondary clock correcting and checking mechanism adapted for use in the system shown in Figure 1.

Figures 3 to 7 are schematic side views showing various consecutive phases of operation of the secondary clock correcting and checking mechanism illustrated in Figure 2.

Figures 8 to 10 are schematic side views showing the consecutive phases of operation of a modified form of secondary clock correcting and checking mechanism embodying my invention.

Figure 11 is a fragmental view showing the correcting stop and nose constructions utilized in my invention.

My invention will be specifically described in connection with a time distributing system, but it will be obvious to those skilled in the art that the secondary motor mechanisms hereinafter disclosed may be applied to the operation of traffic signal control switches in predetermined phase relationship. The electrical phases of my invention will first be described after which a description of the secondary correcting or phasing mechanisms utilized will be given.

In the power house, Fig. 1, a generator of any well known type driven by any suitable prime mover delivers current to a network 11, 12, supplying or distributing current for the operation of lights 13, motors 14, other electrical appliances and clocks 15, indiscriminately. The generator may supply alternating or direct current power to the system. A very low resistance inductance or a suitable reactance 16, or any other suitable means to eliminate radio interference, may be connected in the power circuit. Secondary transformer winding 17 connected across conductors 11 and 12 is under the influence of primary transformer winding 18. Winding 18 is connected to a high frequency oscillator 19 of any well known construction, which is actuated at certain times by closure of feed contacts 20 and 21 through operation of a cam 22 periodically actuated by a master clock, of any well known construction, located in the power house. When the master clock closes contacts 20 and 21, oscillator 19 is connected to the generator, and high frequency oscillations are sent into and over the network through transformer windings 17 and 18. For correction once each hour, cam 22 driven by the master clock may be provided with at least two different types of code teeth, depending upon the particular correcting mechanisms used. The preferred arrangement in alternating current systems comprises a series of lifts or teeth of progressively increasing length. These groups correspond to the hours counterclockwise from twelve to one, and provide correction effected from the power house once an hour on the exact hour, as will more fully hereinafter appear. Longer and shorter periods between corrections may be chosen without departing from the spirit of this invention, as for example, half hours, quarter hours, one tenth of an hour (six minutes), or longer periods, say two, or four, or six hours, or twelve or twenty-four hours, by suitably varying the periphery of cam 22 to provide suitable groups of teeth for the desired correction intervals. The second type of teeth comprises twelve groups of teeth, the first group having one long tooth, the second group one short and one long, the third group two short and one long, the fourth group three short and one long, and so on to the twelfth group which consists of eleven short teeth and one long tooth. The mechanism in which this type of teeth is used is described in the latter part of the specification and is shown in Figures 8, 9 and 10.

Generally speaking, the hourly correction will suffice in frequency controlled A. C. systems. In D. C. systems it may be advantageous to send out the time corrections more frequently, because of the somewhat greater difficulty of maintaining the operation of D. C. motors at constant speeds.

The cam disc 22 of the master clock at the power house does not rotate continuously, but is released for the proper extent of angular rotation to rotate a single group of teeth to actuate contacts 20 and 21 before coming to rest by means of the usual striking train of an ordinary striking clock, in a manner that will be obvious to those skilled in the art. The release is so arranged that the end of each signal group sent out by the oscillator coincides with the exact hour, or the exact time interval to which correction of the secondary or controlled clocks is to be made.

As shown, lights 13, motor 14, and clock 15 are connected in local or house circuits, indicated by square 23, which are connected to the network conductors 11 and 12 through protective fuses 24 and the usual local switches, not shown. Any of the house or local circuits may be interrupted independently of the others by the blowing of fuses and opening of local switches, causing outage of the clocks on the interrupted circuit only.

The secondary clock arrangement, of which any desired number may be connected across any branch of the network, comprises a suitable clock-drive motor 25 such, for example, as the type disclosed in Warren Patent No. 1,283,435 granted October 29, 1918, and the usual clock mechanism driven thereby, of any usual construction and one of my improved high-frequency-responsive control mechanisms hereinafter described in detail. Such clock motors are normally not affected by the high-frequency impulses of the character impressed on the network by oscillator 19, but a protective inductance or a reactance 26, or any other suitable protective device may be connected in the motor circuit as shown. My improved high-frequency-responsive device provided in clock 15, comprises primary transformer winding 27 connected directly across the network, and secondary transformer winding 28, inductively affected by winding 27, and connected to high-frequency-responsive relay or magnet 29. A bridging condenser 30 is connected across relay or magnet 29. As long as the high frequency current flows over the network, relay or magnet 29 will be energized and will hold its armature 31 in the attracted position against the pull of the retractile spring 32, and when the high frequency impulses cease, spring 32 will retract armature 31 in well known manner. Armature 31 effects the correction of the clock by operation of correcting mechanism more fully hereinafter described.

When my invention is utilized on an alternating current network, I preferably employ self-starting synchronous clock motors and clock mechanisms of any well known type. On direct current networks I employ direct current motors of the constant speed type, preferably such as are employed in D. C. ampere-hour meters to drive the usual electrical clock mechanism. Such motors operate practically at constant speed under constant load, even with considerable variations in the line voltage.

Likewise, I do not wish to limit myself to the particular arrangement of the high-frequency-responsive device shown. For example, in the textbook on Alternating Current Signaling Practice published in 1915 by the Union Switch & Signal Company, Swissvale, Pennsylvania, several forms of frequency-responsive relays are illustrated and described suitable for utilization in my present invention as the high-frequency-responsive device 29. For the purposes of time distribution, the vane-type relay, disclosed in said textbook, recommends itself because of its greater simplicity and smaller cost.

In operation of my improved system, the character of the controlling signals sent out by the master clock at the power house must bear a direct relation to the exact time indicated by the master clock when the impulses are sent. Two general methods of differentiation between signals may be employed, as above pointed out, by cutting different code teeth on the periphery of cam disc 22. The first method depends upon the length of the signals for correcting the secondary clocks, the length of the twelve o'clock signal being one unit; the length of the eleven o'clock signal being two units; and so forth, and the length of the one o'clock signal being twelve units. The second method most closely follows the analogy of a striking clock for hourly correction, and comprises sending out groups of signals, each signal comprising a series of high-frequency impulses. One signal is sent out at twelve o'clock; two signals are sent out at eleven o'clock; four signals at nine o'clock, and so forth, with twelve signals at one o'clock. The groups of signals each consists of two kinds of elements, short signals which operate the counterpart of a ratchet sector in the corrector mechanism hereinafter described, and a final long signal to release the correcting mechanism proper. Thus, in an hourly correction system utilizing this method, the twelve o'clock impulse is one long impulse; the eleven o'clock one short and one long; the ten o'clock two short and one final long, and so forth. The short impulse in each case will propel a ratchet one tooth, as will be apparent from the following description of the detailed correcting mechanism.

Each method has its advantages. The first has the advantage of simplicity, but is dependent for its practical operation on reasonably close synchronism of the clock motors. Since, in alternating systems, motor synchronism is absolute, in such systems the first method is preferable. In direct current systems, being independent of synchronism of the motor, the second method may be preferable. Each method may, however, be used on A. C. or D. C. networks.

Referring now to the specific correcting mechanism disclosed in Figures 3 to 7, for the purpose of clarity of illustration, the various elements of the mechanism have been shown separated and more or less schematically to avoid complicated drawings, and it will be understood that in actual construction, the various parts may occupy relative positions best adapted for convenient manufacture, the matter of convenient arrangement of parts being within the mechanical skill of a designer in the light of the following disclosure. Throughout the following disclosure elements have been shown which permit of the easiest and clearest illustration in view of the complexity of the mechanism involved. The members of the correcting mechanism in the illustrative examples of the drawings which are shown with directional arrows placed thereon or in conjunction therewith preferably receive their rotational movement from the clock driving motor where the invention is applied to correction of motor driven clocks.

Figures 2 and 3 show all the essential parts of a secondary clock, except hands, dial, case and frame, etc., in the position when the clock is operating normally under the influence of its motor. The ordinary clock arrangement of nested shafts 33 and 34, suitably journaled and supported in the clock frame members 35 and 36, is provided with the hour-hand of the clock carried on shaft 33, and the minute-hand carried on shaft 34. A second-hand may be provided in the ordinary manner. Gear 37 and pinion 38 fastened to and driving shafts 33 and 34 respectively, and in turn meshing with and driven by pinion 39 and gear 40 respectively, constitute the hand operating works of the clock. Pinion 39 and gear 40 are rigidly secured together and carried by the fixed shaft or stud 41, the inner end of which is rigidly secured in boss 42 of frame member 35 and upon which they are free to rotate together. The ratio of gearing is such that for one revolution of the gear 37, pinion 38 makes 12 revolutions. Gear 40 meshes with and is driven by pinion 43, fixedly secured to and rotatable with gear 44. Pinion 43 and gear 44 are rotatably mounted on a stud 45 supported from arm 46 of a rocker member 47 pivotally mounted for rotation on sleeve 48 which is rotatably supported on motor shaft 49. Motor shaft 49 is suitably journaled in frame members 35 and 36 and is driven at the proper speed through reduction gearing 50 by the clock motor 25. Pinion 51 mounted on and driven by motor shaft 49 meshes with and drives gear 44.

Secured to arm 52 of rocker member 47 is armature 53 of magnet 54. Magnet 54 is under control of the high-frequency-responsive relay 29, as shown in Fig. 1, through armature 31 and contact 55 which as shown are arranged to feed current from the network to which the clock is connected, in such manner that when armature 31 is attracted the magnet 54 is energized. I do not wish to limit myself to the use of a relay at 29 as the system may be operated directly by making magnet 54 itself high-frequency-responsive in a manner that will be obvious to those skilled in the art.

Pinion 51 is driven by the motor of the clock at such a normal speed that the minute shaft 34 is caused to make one revolution an hour, and the parts are normally held in the relationship shown in Figure 3. In this relationship of parts it follows that, provided the motor runs at a uniform speed, the apparatus so far described will form a secondary clock.

The mechanism through which periodical check or correction of the clock is effected will now be described. Superimposed upon the nested shafts 33 and 34 and rotatable on shaft 33 is a sleeve 55 about which spring 56 is coiled. One end of spring 56 is connected to gear 37 and the other end is connected to frictional wheel 56a. Spring 56 is under tension in such manner that it tends to preserve a predetermined relation circularly between gear 37 and wheel 56a by pressing pin 57, rigidly secured to gear 37, against pin 58, rigidly secured to wheel 56a, the arrangement being such that if gear 37 is arrested against motion clockwise, wheel 56a still can be moved a certain angular distance in a clockwise direction, provided enough force is applied to overcome the normal tension of spring 56. As soon as such force is released, however, wheel 56a will snap back into its normal position, shown in Figures 2 to 5 inclusive.

A series of stops 59 to 70 projecting from the inner face of gear 37, and a corresponding series 59a to 70a projecting from the inner face of wheel 56a is provided, as shown in Fig. 2. These stops are all alike and are semicircular at their base and provided with beveled surfaces as indicated in Figure 11, in which stop 70 is shown. The stops are arranged spirally and constitute the equivalent of the "snail", well known in striking clocks. By means of such a snail, in an ordinary striking clock, the number of strokes is determined. In the present invention, however, the snail is used to effect correction of the block. In the arrangement shown, there is one stop for each exact hour of actual time, 59 and 59a corresponding to one o'clock actual time; 60 and 60a to two o'clock, and so on to 70 and 70a which correspond to twelve o'clock noon or midnight.

These stops coact with the similar noses 71 and 71a of a pair of rocking levers 72 and 72a. Noses 71 and 71a are preferably secured to the ends of levers 72 and 72a by means of long flat springs 71' riveted to the levers at 71" as shown in Figs. 2 and 3, and are provided with beveled surfaces as shown in Figure 11 for a purpose that will more fully hereinafter appear. Lever 72 is secured to segment 73 by means of screws 74, and formed integrally therewith is an extension 75 provided with a toothed ratchet segment 76. Segment 73 is pivotally mounted on sleeve 48. Lever 72a is provided with an elongated slot 77 through which sleeve 48 extends. Extending through slots 78 of lever 72a and connected to segment 73 are the shanks of two headed rivets 79 which cause lever 72a to oscillate with segment 73 about sleeve 48 as a pivot, but permit a sliding motion of lever 72a with relation to segment 73 within the limits of slots 77 and 78. Formed integrally with lever 72a is an extension 81 which terminates in arcuate segment 82, the function of which will more fully hereinafter appear. A spring 83 secured by means of pin 84 to lever 72a and by means of pin 85 to segment 73, and a spring 86 one end of which is secured to pin 85 and the other end of which is secured by pin 87 to a suitable frame member (not shown), normally hold levers 72 and 72a and segment 73 in the position shown in Figure 3, with noses 71 and 71a outside of the orbit of the outermost of stops 59 to 70 and 59a to 70a, so the hour wheel is free to rotate under the influence of its motor. When, however, the levers 72 and 72a are moved inwardly, noses 71 and 71a may arrest the motion of both gear 37 and friction wheel 56a under certain conditions more fully hereinafter described.

The apparatus is shown in Fig. 3 as it would stand at 12 o'clock, and it will be seen that the noses 71 and 71a are so located that they will stop the wheels 37 and 56a if moved into the orbit of the stops 70 and 70a, the 12 o'clock stops.

Assuming now that the master clock in the power house sends an impulse and that magnet 54 is energized as a result, armature 53 and its associated rocker arm 52 and the associated parts will be moved to the position shown in Figure 4. In this position of parts, the end 91 of lever 52 is raised sufficiently to permit shoulder 92 of lever 93 to move under lever end 91, in a manner that will more fully hereinafter appear, to thereby hold rocker arm 52 and related parts in the position shown in Figure 4 with pinion 43 disengaged from gear 40 and interrupting the driving connection between the motor and shafts 33 and 34, resulting in the stopping of the clock hands. Interruption of the drive is effected through the movement of pinion 43 with the rocker arm 46 carrying it out of contact with gear 40. Gear 44, however, still maintains contact with pinion 51 during this movement, and rotates pinion 43 idly.

This movement of the rocker assembly meshes gear 94, journaled at 95 on rocker arm 46, with a gear 96 suitably journaled from the frame work (not shown) by means of shaft 97. Gear 96 is constantly driven by the motor of the clock through a gear train (not shown) at a speed considerably higher than the speed of pinion 43 in the direction of the arrow. Gear 94 meshes with and rotates toothed section 98 of segment 73 and rotates segment 73 together with the associated parts through an arc, the extent of which depends on the length of time magnet 54 is energized. For operation of this form of my improved correcting mechanism, the master clock at the power house sends out signals of varying lengths, that sent out at 12 A. M. or 12 P. M. being the shortest and equal to one unit, that sent out at 11 o'clock being two units in length, and that sent out at 1 o'clock being the longest and being equal to twelve units. The parts are so arranged that each unit length of signal will propel the segment 73 and rocker assembly a distance sufficient to raise ratchet segment 76 of lever 75 the angular distance of one tooth past the nose 99 of pawl 100. Pawl 100 is pivotally mounted to the framework, not shown, by means of pin 101, and is normally urged counter-clockwise in Figs. 3 and 4 by tension spring 102 secured at 103 to pawl 100, and at 104 to the framework. Pawl 100 is provided with an extension which is held against pin 106 of lever 93 so that pawl 100 tends to carry lever 93 in a counterclockwise direction in Figs. 3 and 4 about pivot point 107.

It will, accordingly, be seen that in the normal position of parts as shown in Figure 3, end 91 of lever 52 holds lever 93 and pawl 100 to the right against the tension of spring 102, and nose 99 is held disengaged from ratchet teeth 76, and then when magnet 54 is energized and shoulder 92 is permitted to move under the end 91 of lever 52, pawl 100 moves under the influence of spring 102 to engage the teeth of ratchet sector 76 and prevents the ratchet sector and its associated levers 72 and 72a from dropping back so that, after the cessation of the signals from the power house, the levers 72 and 72a will remain in the position into which they have been propelled during the reception of the signal and consequent energization of magnet 54. Accordingly, it will be seen that levers 72 and 72a will be set to a position corresponding to the time signal that is sent out. In event the correction signals are received in such manner that interference develops between any of the stops and noses 71 and 71a, the beveled surfaces of the stops and noses will coact as shown in Figure 11 to force noses 71 and 71a inwardly, deflecting springs 71' and 71" without interfering with the proper setting of levers 72 and 72a. As soon as the levers are moved past the interfering stops, the springs 71' and 71" will force the noses 71 and 71a outward into the position shown in Figure 2.

Assuming that the master clock in the power house indicates one o'clock when the signal is sent, and as a consequence, the clock has sent out the longest signal it is capable of sending, or the 12 unit length signal, the position of parts will be that shown in Figure 5 just at the end of the signal. In this position of parts, levers 72 and 72a have been propelled such a distance that the noses 71 and 71a are positioned in the orbit of the stops 59 and 59a, which correspond to the one o'clock position, as has already been explained. Had the shortest impulse been sent instead of the longest, noses 71 and 71a would be in the orbit of stops 70 and 70a, which are the twelve o'clock stops. Assuming that the secondary clock has stopped accidentally just at twelve o'clock, the stops 59 and 59a will be in the position shown in Figure 3, and with the correction signal for one o'clock fully received by magnet 54, the parts will be conditioned as shown in Figure 5, reading for setting the clock to one o'clock with the power supply restored and the clock motor running. Upon cessation of the signal, armature 53 and the connected levers 52 and 46, together with the gears carried thereby, will move clockwise under the influence of gravity, assisted by a suitable spring, if desired (not shown), about sleeve 48 as a pivot, until at the moment when the impulse has actually ceased, the parts have assumed the position shown in Figure 6. This results in forcing lever 93 and pivot pin 107 downward. This movement of pin 107 forces the end of rocker lever 108, on which it is carried, clockwise about pivot pin 110 secured to the framework, and forces friction-well 111, mounted on shaft 112 of rocker 108, into frictional contact with the periphery of friction-wheel 56a. Wheel 111 is constantly rotated at high speed in the direction of the arrow by means of frictional engagement with wheel 113 carried on shaft 114 journaled in rocker 108. Shaft 114 is driven at a considerable speed by the motor of the clock through a suitable gear train and flexible shaft connection (not shown) to drive the wheel 113 in the direction of the arrow. The peripheries of wheels 56a, 111 and 113, it will be understood, may be suitably serrated and hardened to provide good wearing and effective frictional drive surfaces, or suitable meshing gears may be substituted therefor. If desired wheel 113 may be eliminated by securing wheel 111 to shaft 112, extending shaft 112 and mounting a driving pinion on the opposite end thereof which is brought into mesh with a driving-gear rotating continuously at high speed when wheel 111 is lifted into engagement with wheel 56a by the action of rocker 108.

The travel downward of lever 93 is limited by the motion of the rocker 108 pivoted at 110, which is arrested when wheel 111 is positioned in driving engagement with wheel 56a, and the parts are so proportioned that while driving engagement is interrupted between gears 96 and 94 when the motion of rocker 108 is arrested, stopping the further driving of sector 98 and the related parts, pinion 43 is still held out of mesh with gear 40 and the hands of the clock are still held stationary. The speed of wheel 113 is made sufficient so that an entire revolution of 56a may be produced in a fraction of a second, in order that the entire correction operation may take place so rapidly even under the most extreme conditions, as to introduce no appreciable error in the time indication.

Wheel 111 now rotates the wheel 56a, and through the action of spring 56, gear 37 will be rotated with it clockwise until stops 59 and 59a impinge upon noses 71 and 71a of levers 72 and 72a. When this occurs, gear 37 will have rotated the hand-driving train until the hands of the clock show exactly one o'clock, the minute shaft having been advanced one entire revolution and the hour hand having been advanced from twelve to one on the dial. Wheel 37 will now be arrested with stop 59 against nose 71, but wheel 56a is still urged clockwise, tensioning spring 56 and causing stop 59a to force lever 72a to the right to the limit of its travel on rivets 79, as shown in Fig. 7. This movement of the lever 72a causes quadrant 82 to engage pin 106 and to force lever 93 together with pawl 100 clockwise to the position shown in Fig. 7. Shoulder 92 now no longer supports lever 52, and lever 52 together with the lever 46, rocker 108, and the parts carried thereby, are restored to the normal position shown in Fig. 3, under influence of gravity, causing pinion 43 to mesh with gear 40, and re-establishing the drive for the clock hands from the motor. The hands of the clock will now resume their travel, as levers 72 and 72a are moved out of the orbit of travel of stops 59 and 59a by the action of spring 86, as soon as wheel 11 is disengaged from wheel 56a. Even though nose 99 of pawl 100 has been withdrawn from engagement with ratchet sector 76, rocker 73 and the associated parts cannot restore to normal so long as wheel 111 engages and exerts torque upon wheel 56a and upon lever 72a through stop 59a. While rocker 108 is shown as restored by gravity to the position shown in Fig. 3, if desired, biasing to the normal position may be effected by addition of a suitable spring.

The position of all parts will now be that shown in Fig. 3, except that the wheels 27 and 56a will have been moved forward an amount corresponding to one hour.

Assuming now that the position of all parts is as shown in Fig. 3 at the exact time when the master clock sends out the twelve o'clock impulse, then no correction would take place, none being necessary. Under such conditions, noses 71 and 71a of levers 72 and 72a would be moved into the orbits of stops 70 and 70a in response to a correcting signal of minimum length. Hence, even though the correcting operation took place exactly as described, stop 70 would be prevented from moving from its then correct position, and the mechanism would simply go through the corrective cycle of operations without affecting the position of the hands. If, on the other hand, the clock in question was running fast and indicated time slightly in advance of the correct time, then the operation of the correcting mechanism would cause the wheels 37 and 56a to make almost a full revolution, due to the fact that stops 70 and 70a being already past noses 71 and 71a, wheels 37 and 56a must revolve until stops 70 and 71a, causing the cycle of operations above set forth, with a setting of the hour hand completely around the dial with substantially twelve complete revolutions of the minute hand. It is of course plain that for every revolution of gear 37, the minute shaft 33 makes twelve revolutions.

It is realized that the actual time taken by the correcting mechanism to effect correction may vary with conditions, being dependent upon how far the wheels 37 and 56a must be moved, but the entire operation will take place with such rapidity, that no noticeable error in the time indicated will ensue. The variation in time brought about by the different lengths of impulses sent out by the master clock is already neutralized by having the master clock so arranged that the end, and not the beginning, of the impulse is timed with the full hour, and this ending of the impulse is further tied in with the correct time so as to allow for the mean time of operation. In other words, the end of the impulse is arranged to precede the absolute full hour by a fraction of a second corresponding to the length of time the mechanism takes to rotate wheel 37 one-half of a revolution. Assuming that the average time taken for correction is one-half second, the greatest deviation from absolutely correct time which could exist would be one quarter second, an interval of time no longer discernible or observable on the ordinary clock, and nearly the limit of time indication of a stop watch. As this minimal error is not cumulative, it is of absolutely no importance on clock operation, and my improved system will permanently keep within limits which could not possibly be preserved by anything but the very best chronometers.

A modified form of my invention is shown schematically in Figures 8, 9 and 10. These figures show the same apparatus in different positions of the various parts which they assume under the influence of the correcting impulses from the power house. In this form of my invention, the signals sent out from the power house comprise a number of distinct impulses or taps from 1 to 12. Each signal consists of a series of very short impulses or taps with a long final impulse or tap, the code signal corresponding to 12 o'clock consisting of one long tap, and that for 1 o'clock consisting of 11 short taps followed by a long tap.

The clock-hand driving mechanism embodying the parts driven by gear 40 and friction wheel 111 are the same as described in connection with Figures 2 to 7, and function in like manner. Similar reference characters have been applied to similar parts, and for a full understanding of the parts not hereinafter referred to in detail, reference may be had to the foregoing description thereof.

Figure 8 shows the parts in their normal position; Figure 9 shows the same parts just before the termination of the long tap or signal of the eight o'clock signal; and Figure 10 shows the parts immediately after the termination of the long tap.

In this form of the invention gear 40 meshes with and is driven in the direction of the arrow by pinion 121 mounted on shaft 122 of rocker member 123. Pinion 121 meshes with and is driven in the direction of the arrow by pinion 124, journaled on rocker 123. Pinion 124 in turn meshes with and is driven by pinion 125 secured on and continuously driven by the clock shaft 49, on which rocker member 123 is pivotally mounted. Clock shaft 49 turns in a clockwise direction as indicated by the arrow on wheel 126. Mounted on and driven by motor shaft 49 is a driving-gear 126 which meshes with and drives pinion 127 at high speed. Pinion 127 is secured to and drives shaft 112, carrying friction drive-wheel 111 at high speed.

It will be seen that in the position of parts shown in Figure 8, motor shaft 49 through gears 124 and 121 will drive gear 40 and the mechanism in normal timing operation. When, however, rocker 123 is released for rotation in a clockwise direction in response to the received correcting signals in a manner hereinafter described in detail, gear 121 will be disengaged from gear 40, and the friction wheel 111 will be thrown upward and held in driving engagement with the driving wheel 56a of the correcting mechanism.

The end 128 of rocker 123, in the normal position of parts shown in Figure 8, rests on shoulder 129 of bell-crank member 130. Bell-crank member 130 is pivotally mounted on pivot pin 131 suitably supported from the framework of the mechanism, and is normally urged clockwise about pivot 131 to the position shown, by spring 132, one end of which is connected to the bell-crank and the other end of which is connected to a suitable pin mounted on the supporting framework. Arm 133 of bell-crank member 130 is positioned in the path of movement of pin 134 carried on slide member 135 for a purpose that will more fully hereinafter appear. Formed in slide member 135 are elongated guide slots 136 through which the shanks of headed rivets 137 secured to bell-crank member 138 extend. Rivets 137 secure slide 135 slidably in position on bell-crank member 138, and slide 135 normally is held by the action of gravity with the shanks of rivets 137 normally engaging the upper ends of slots 136 as shown in Figure 8. Formed on slide 135 are rack teeth 139 adapted to engage the teeth of a continuously rotating gear wheel 141. Gear wheel 141 is mounted on and driven in the direction of the arrow by a suitably journaled shaft 142, through any suitable gear train from the clock motor (not shown). In operation of the device, when rack 139 is brought into mesh with the teeth of gear wheel 141, slide 135 will be raised an amount depending upon the time of engagement of the rack 139 with gear wheel 141 in a manner that will more fully hereinafter appear.

Bell-crank 138 is secured to and rotates spindle 143, suitably supported in bearings in the framework, and the armature 53 of the magnet 54 is rigidly secured to bell-crank 138, so that as the magnet 54 is energized in response to received signals, rack 139 will be brought into mesh with gear 141 for a purpose that will more fully hereinafter appear. Rigidly secured to spindle 143, is pawl operating arm 144, provided with the pawl operating pin 145. With magnet 54 deenergized, armature 53 will be retracted and bell-crank 138 will be held against stop pin 146 under the influence of gravity or a retractile spring 147, and pin 145 will engage and hold in raised position gravity escapement pawl 148 pivoted at 149 to the framework. Pawl 148 is provided with detent or nose 150 adapted to engage the teeth of ratchet sector 151. When magnet 54 is energized armature 53 will be attracted and pin 145 will be lowered permitting nose 150 to engage ratchet teeth 151. In lowered position, pin 145 will also engage extension 152 of escapement pawl 153 pivoted to the framework at 154, raising nose 155 of pawl 153 out of engagement with teeth of ratchet 151. Ratchet sector 151 is formed integrally on an arm 155', which is secured to and rotatable with a plate member 156 about a pivot pin 157 suitably secured to the framework. Arm 155' is secured to or formed integrally with lever 72 (see Fig. 2); and secured to plate 156, which replaces segment 73 of the form of invention shown in Figures 2 to 7, are headed rivets 79, the shanks of which extend through slots 78 of arm 72a, on the side of plate 156 opposite lever 72 and arm 155'. Noses 71 and 71a cooperate with stops 59 to 70, and 59a to 70a, in a manner that will be clear by reference to the description of these parts given in connection with Figures 2 to 7. Levers 72 and 72a together with plate 156 and arm 155' are so proportioned that they normally tend to rotate counterclockwise in Figure 8 under the influence of gravity, so that as magnet 54 is alternately energized and deenergized these parts will rotate counterclockwise step by step in Figure 8 under the alternate control of pawls 148 and 153. If desired, a suitable spring 157' connected at one end to plate 156 and at the other end to a suitable pin supported from the framework may be utilized to aid the counterclockwise rotation of plate 156 and the parts carried thereby, in operation of the device.

A tension spring 158 connected at 159 to plate 156 is provided with a looped end 161 which loops over pin 162 secured in the upper end of arm 163 of bell-crank 164. Carried by arm 163 of bell-crank 164 is a pin 165 normally held in engagement with segment 82 of extension 81 of arm 72a by the action of gravity on bell-crank 164. Bell-crank member 164 is suitably pivoted at 166 to the framework. Secured at 169 to bell-crank arm 167 is the upper end of a spring 171, the lower looped end 172 of which is looped around pin 173 secured in rocker member 123.

Formed integrally with bell-crank member 164 is a latching projection 174, the end of which is adapted to coact with nose 175 of a latching member 176, pivoted on pin 131. Latching member 176 is normally held against pin 177 carried by bell-crank member 130, by the action of a spring 178 secured at one end to the member 176 and at its other end to arm 133 of bell-crrank member 130.

In operation of this form of invention with the parts as shown in Figure 8, the time mechanism is driven in timed relation to the master-clock at the powerhouse through the motor shaft 49, gear train 125, 124, 121 and 40, and the mechanisms driven by gear 40 in the manner hereinbefore fully set forth in connection with Figures 2 to 7. Nose 155 of escapement pawl 153 is held by gravity in engagement with that tooth of ratchet sector 151 which will hold noses 71 and 71a of levers 72 and 72a out of the orbit of movement of stops 70 and 70a carried by gear 37 and wheel 56a in the position shown in Figure 8.

Assuming now that a series of correction signals are received corresponding to the signals for eight o'clock, on the fifth time signal group, magnet 54 will be energized in succession by four short impulses and by a final long impulse. Upon each energization of magnet 54, nose 155 will be disengaged from the ratchet sector 151 slightly before the pawl 148 engages the teeth of the ratchet sector, the time interval being sufficient for the ratchet 151 to rotate through an arc equivalent to one tooth. This rotation is in a counter-clockwise direction under the influence of gravity or of springs 157'. Upon deenergization of magnet 54, the nose 155 of the pawl 153 engages the teeth 151 before the pawl 148 is released therefrom, thus causing a locking of the ratchet 151 in position. Accordingly, for each impulse or tap received by magnet 54, arms 72 and 72a together with ratchet 151 and the connected parts will rotate a distance corresponding to one tooth of the ratchet sector 151 in a counterclockwise direction. The parts are so proportioned that for each advance of one tooth of sector 151, noses 71 and 71a will be advanced into the orbit of movement of a different stop starting with the twelve o'clock stops 70 and 70a, for one tap or impulse, the eleven o'clock stops 69 and 69a at the completion of two taps, and the one o'clock stops 59 and 59a at the completion of the twelve tap signal. Accordingly, at the completion of the fifth or final impulse or tap the parts will have moved to the position shown in Figure 9, with noses 71 and 71a positioned in the orbits of movement of stops 66 and 66a, the eight o'clock stops.

During each energization of magnet 54, rack 139 of slide 135 will be brought into contact with the gear 141, but the time of engagement is not of sufficient length during the short taps or impulses to cause engagement of pin 134 with arm 133 of bell-crank 130 a sufficient amount to effect release of end 128 of rocker 123 from shoulder 129 of the bell-crank 130, and after the termination of each short tap or impulse, slide 135 drops by gravity to the position shown in Figure 8. During receipt of the final or long impulse or tap of the correcting signal, the magnet 54 will be maintained in engagement a sufficient length of time, so that slide 135 will be raised a sufficient distance to cause pin 134 to engage arm 133 of bell-crank 130, and to rotate bell-crank 130 counterclockwise to the position shown in Figure 9, permitting rocker end 128 to drop off shoulder 129 of the bell-crank 130. Rocker 123 will then move under the influence of gravity to the position shown in Figure 9, disengaging gear 121 from wheel 40 and interrupting the dial train and hands driving connection with motor shaft 49, and then engaging continuously rotating high speed friction wheel 111 with the correcting friction drive-wheel 56a.

As bell-crank member 130 is moved by pin 134, nose 175 of latch 176 will swing to the latching position shown in Figure 9 with relation to latching projection 174 of bell-crank 164. As a result, up cessation of the long or final tap or impulse while the bell-crank member 138 and slide 135 will again assume the position shown in Figure 8, bell-crank 130 will be latched by member 176 and latch projection 174 in the position shown in Fig. 9.

Upon engagement of the rotating wheel 111 correction wheel 56a will be rotated at high speed and will rotate with it through the action of coil spring 56, the clock driving-gear 37, until stop 66 of gear 37 engages nose 71 of lever 72 in the manner hereinbefore set forth in detail in connection with Figures 2 to 7. When stop 66 engages nose 71, wheel 37 and the secondary clock mechanism will be arrested in the eight o'clock position. Rotation of wheel 56a will, however, continue tensioning spring 56 with the stop 66a in engagement with nose 71a of lever 72a forcing lever 72a in the direction of the arrow on the shanks of headed rivets 79, and forcing the sector 82 against pin 165 of bell-crank 164, rotating bell-crank 164 about pivot 166 in a clockwise direction to the position shown in Figure 10. As bell-crank 164 rotates under the influence of movement of arm 72a, spring 171 will be raised, rotating rocker 123 in a counterclockwise direction, and latching projection 174 of bell-crank 164 will be moved out of engagement with latching nose 175 of latch 176, permitting bell-crank 130 to restore toward the position shown in Figure 8 under influence of spring 132. Rotation of rocker 123 in a counterclockwise direction about pivot 49 to the position shown in Figure 10 will occur when pinion 121 will re-engage gear 40 to again drive the clockwork from motor shaft 49, and friction wheel 111 will be disengaged from the correcting friction wheel 56a. When pinion 121 is brought into mesh with gear 40, the clockwise movement of bell-crank 130 under the influence of spring 132 will have brought shoulder 129 of bell-crank 130 underneath end 128 of rocker member 123, with the parts in the relative position shown in Figure 10.

During the clockwise movement of bell-crank 164 under the influence of the movement of arm 72a, spring 158 is tensioned. Upon disengagement of friction wheel 111 from the friction wheel 56a, spring 56 (Fig. 2) will retract wheel 56a until stop pin 58 of wheel 56a again engages stop pin 57 of gear 37. When the pressure of stop 66a is relieved on arm 72a, the arm 72a, plate 156 and the connected arms 72 and 155' are free to rotate under the influence of spring 158, and will rotate until arm 155' engages stop 175. Lever 72a is now free to slide to the position shown in Figure 8 on rivets 79, and bell-crank 164 will restore lever 72a to the left under the combined influence of gravity and the action of springs 158 and 171, and the parts will again be in the normal position shown in Figure 8, driven directly from the motor shaft, ready for a further cycle of correcting operations.

While my invention has been disclosed in systems in which the correcting signals are received over the circuit which supplies driving power to the motors, it will be clear to those skilled in the art that a separate circuit may be utilized to control magnets 54, either by alternating or direct current signals. It will, for example, be apparent that magnets 54 may be controlled by correcting signals broadcast by radio, and received over the usual radio receiving sets.

By the use of my invention, synchronizing the frequency of an alternating current network, now absolutely necessary where it is desired to employ motor clocks, may be eliminated. For other operating reasons the frequency of commercial alternating current must be kept close to say 60 cycles, and the present day governors employed on prime movers permit of very small deviation from normal speed. These deviations could not possibly materially affect the correct indication of the clocks within the period of one hour, to an objectionable degree. Likewise, my invention permits the use of motor clocks and time devices, such as time switches, traffic signals, and the like where definite phase relations of different mechanisms are desirable, on direct current commercial power systems, a feat heretofore considered impossible of accomplishment. These advantages of my invention are of considerable commercial importance, as will be apparent to those skilled in the art.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is—

1. In combination, time mechanism including an electrical driving motor, a dial train and hands and means interconnecting said motor and said dial train and hands in normal driving relation; power supply connections for said motor; means responsive to signals received over said supply connections for predetermining any one of a plurality of positions of arrest for said dial train and hands and disconnecting said first-mentioned means; said signal responsive means predetermining said position of arrest in accordance with the character of the signal received; and means driven by said motor for operating said dial train and hands to the position predetermined by said predetermining means upon cessation of the signals over said supply connections.

2. In combination, time mechanism including an electrical driving motor, a dial train and hands and means interconnecting said motor and said dial train and hands in normal driving relation; power supply connections for said motor; means responsive to signals received over said supply connections for predetermining any one of a plurality of positions of arrest for said dial train and hands and for disconnecting said first mentioned means; means driven by said motor for adjusting said dial train and hands to the position determined by said predetermining means; and means under the control of said adjusting means for initiating time operation of said dial train and hands after completion of the adjusting operation.

3. In combination, a time mechanism including an electrical driving motor and a dial train and hands; power supply connections for said motor; means responsive to high frequency signals of various characteristics received over said supply connections for disconnecting said dial train and hands from said driving motor and predetermining in accordance with the characteristics of such signals a particular one of a plurality of positions of arrest therefor; means driven by said motor for adjusting said dial train and hands to the position predetermined by said first mentioned means; and means operated when said adjustment has been completed to connect said driving motor to said dial train and hands in normal driving relationship.

4. In combination, time mechanism including an electrical driving motor and a dial train and hands and means interconnecting said motor and dial train and hands in normal driving relation; power supply connections for said motor; means responsive to high frequency correcting signals received over said supply connections for predetermining any one of a plurality of positions of arrest for said dial train and hands and for disconnecting said first mentioned means; means for adjusting said dial train and hands to the position determined by said predetermining means upon the completion of reception of a correcting signal over said connections; and means under the control of said adjusting means for initiating time operation of said dial train and hands after completion of the adjusting operation.

5. In combination, a secondary clock mechanism including an electrical driving motor and a dial train and hands; power supply connections for said motor; means responsive to high frequency signals received over said supply connections for disconnecting said dial train and hands from said driving motor and predetermining any one of a plurality of positions of arrest for said dial train and hands; means driven by said motor for adjusting said dial train and hands to the position predetermined by said first mentioned means in response to the received signals; and means operated by said adjusting means when said dial train and hands reach the position predetermined by said first mentioned means to disconnect said driving motor from said adjusting means and connect it to said dial train and hands in normal driving relationship.

6. In combination, time mechanism including an electrical driving motor and a dial train and hands; a power supply circuit including said motor; means responsive to and controlled by code signals propagated over said power supply circuit, while said circuit functions to supply normal power to said motor, for predetermining one of a plurality of positions of arrest for said dial train and hands; said code signals each being different and each corresponding to a particular time indication; and means controlled by said signal responsive means for setting said dial train and hands to said one of said plurality of positions selectively determined by the particular one of said code signals transmitted over said supply circuit.

7. In combination, time mechanism including an electrical driving motor and a dial train and hands; correcting means for said dial train and hands adapted to be driven by said motor and normally disconnected from said motor; an armature operated in response to received signals; means operated by said armature and adapted to disconnect said motor from said dial train and hands and to connect it to said correcting means in response to received signals; and means conditioned by operation of said armature to control the operation of said correcting means, said control means being operable to disconnect said motor from said correcting mechanism and to connect it to said dial train and hands in normal drive relationship after the completion of the correcting operation.

8. In combination, time mechanism including an electrical driving motor and a dial train and hands; power supply connections for said motor; means controlled over said power supply connections for predetermining any one of a plurality of positions of arrest for said dial train and hands; and means operable by said motor for operating said dial train and hands at an increased speed to the position predetermined by said predetermining means.

9. In subcombination, time mechanism including an electrical driving motor and a dial train and hands; power supply connections for said motor; means for disconnecting said dial train and hands from said motor; means controlled over said power supply connections for predetermining any one of a plurality of positions of arrest for said dial train and hands; and means driven by said motor for operating said dial train and hands at increased speed to said predetermined position of arrest.

ERNEST A. FALLER.

---

CERTIFICATE OF CORRECTION.

Patent No. 2,167,829.                          August 1, 1939.

ERNEST A. FALLER.

It is hereby certified that error appears in the printed specification of the above numbered patent requiring correction as follows: Page 5, first column, line 63, for "friction-well" read friction-wheel; and second column, line 55, for "wheel 11" read wheel 111; line 67, for "wheels 27" read wheels 37; page 6, first column, line 16, strike out the syllable and words "tion of a stop watch. As this minimal error is" and insert instead 70a come around and impinge upon noses 71 and; and that the said Letters Patent should be read with this correction therein that the same may conform to the record of the case in the Patent Office.

Signed and sealed this 12th day of September, A. D. 1939.

(Seal)                                               Henry Van Arsdale,
                                                              Acting Commissioner of Patents.